US012563334B2

(12) United States Patent
Jeung et al.

(10) Patent No.: US 12,563,334 B2
(45) Date of Patent: Feb. 24, 2026

(54) WEARABLE DEVICE

(71) Applicant: SAMSUNG ELECTRONICS CO., LTD., Suwon-si (KR)

(72) Inventors: Yongbum Jeung, Suwon-si (KR); Yongwook Park, Suwon-si (KR); Jeock Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 198 days.

(21) Appl. No.: 18/155,254

(22) Filed: Jan. 17, 2023

(65) Prior Publication Data

US 2023/0156397 A1 May 18, 2023

Related U.S. Application Data

(63) Continuation of application No. PCT/KR2021/002942, filed on Mar. 10, 2021.

(30) Foreign Application Priority Data

Jul. 17, 2020 (KR) ........................ 10-2020-0089088

(51) Int. Cl.
*H04R 1/10* (2006.01)

(52) U.S. Cl.
CPC ......... *H04R 1/1075* (2013.01); *H04R 1/1016* (2013.01); *H04R 2201/02* (2013.01)

(58) Field of Classification Search
CPC ...... H04R 1/1016; H04R 1/04; H04R 1/1075; H04R 1/28; H04R 1/02; H04R 1/1083; H04R 1/10; H04R 2201/02

(Continued)

(56) References Cited

U.S. PATENT DOCUMENTS 7,983,433 B2 7/2011 Nemirovski
10,785,553 B2 9/2020 Sang et al.

(Continued)

FOREIGN PATENT DOCUMENTS

CN 101742373 A 6/2010
CN 210225716 U 3/2020

(Continued)

OTHER PUBLICATIONS

International Search Report and Written Opinion for International Application No. PCT/KR2021/002942; International Filing Date Mar. 10, 2021; Date of Mailing Jun. 16, 2021; 38 Pages.

(Continued)

*Primary Examiner* — Norman Yu

(74) *Attorney, Agent, or Firm* — CANTOR COLBURN LLP

(57) ABSTRACT

Wearable devices may include a housing including a first surface facing a first direction and having a speaker nozzle part, and a second surface facing a second direction opposite to the first direction and having at least one microphone hole. A speaker and a microphone are disposed in the housing, the microphone configured to collect an acoustic signal. A partition wall is positioned between the speaker and the microphone. A first space is defined between the speaker and the partition wall, a first path is provided for connecting the speaker and the speaker nozzle part, and a second path, separated from the first space by the partition wall, connects the microphone and the first path.

19 Claims, 14 Drawing Sheets

(58) Field of Classification Search
USPC ...... 381/375, 374, 71.7, 338, 345, 189, 361, 381/353, 357, 372, 71.5, 337, 339
See application file for complete search history.

(56) References Cited

U.S. PATENT DOCUMENTS

| | | | |
|---|---|---|---|
| 11,057,695 B2 | 7/2021 | Williams et al. | |
| 2014/0233746 A1 | 8/2014 | Tanaka et al. | |
| 2014/0311499 A1 | 10/2014 | Lee et al. | |
| 2015/0023542 A1 | 1/2015 | Shimizu | |
| 2016/0142806 A1* | 5/2016 | Lee | H04R 1/1016 381/375 |
| 2016/0300562 A1 | 10/2016 | Goldstein | |
| 2017/0318401 A1* | 11/2017 | Chang | H04R 1/1075 |
| 2018/0151172 A1 | 5/2018 | Min | |
| 2020/0084535 A1 | 3/2020 | Perkmann et al. | |
| 2020/0107099 A1* | 4/2020 | McIntosh | H04R 1/086 |
| 2020/0186907 A1 | 6/2020 | Kim et al. | |
| 2020/0265826 A1 | 8/2020 | Mccutcheon et al. | |

FOREIGN PATENT DOCUMENTS

| | | |
|---|---|---|
| EP | 3503572 A1 | 6/2019 |
| JP | 201519148 A | 1/2015 |
| JP | 2015023495 A | 2/2015 |
| JP | 2015061115 A | 3/2015 |
| JP | 6478317 B2 | 3/2019 |
| KR | 100388806 B1 | 6/2003 |
| KR | 20140125969 A | 10/2014 |
| KR | 101699067 B1 | 2/2017 |
| KR | 20170123818 A | 11/2017 |
| KR | 20200034751 A | 3/2020 |
| KR | 20200067735 A | 6/2020 |
| KR | 20200069650 A | 6/2020 |
| KR | 102312004 B1 | 10/2021 |

OTHER PUBLICATIONS

India Office Action corresponding to Application No. IN202317003344; Issued Dated Jun. 11, 2024.
Extended European Search Report corresponding to Application No. 21842374.7; Dated Jun. 12, 2023.
Notice of Preliminary Rejection corresponding to Application No. KR10-2020-0089088; Dated Oct. 17, 2024.
European Office Action for EP Application No. 21842374.7 mailed on Oct. 6, 2025.

* cited by examiner

WEARABLE DEVICE

CROSS-REFERENCE TO RELATED APPLICATIONS

This application claims the benefit of PCT Application No. PCT/KR2021/002942, entitled "Wearable Device", filed Mar. 10, 2021, which is incorporated herein by reference in its entirety, which claims priority to Korean Patent Application No. 10-2020-0089088, filed Jul. 17, 2020, which is incorporated herein by reference in its entirety.

TECHNICAL FIELD

Various embodiments of the present disclosure relate to a wearable device that is worn on a user's ear.

BACKGROUND ART

A portable electronic device, such as a smartphone or a tablet PC, has been gradually developed in a shape that is able to be worn on the user's body in order to improve portability and accessibility by the user. For example, users who use a wearable device worn on the wrist, the head, or the ear are gradually increasing.

Specifically, a wearable device that is able to be worn on a user's ear among wearable devices worn on the user's body may provide convenience through music reproduction, communication, and calling. The wearable device may include an active noise cancelling (ANC) function for removing surrounding noise.

DISCLOSURE OF INVENTION

Technical Problem

In order to improve ANC performance of a wearable device, the locations at which a speaker and a microphone are mounted may be important.

Technical Solution

In order to minimize sound interference between a speaker and a microphone mounted in a wearable device, a partition wall structure may be provided between the speaker and the microphone. In this case, the partition wall structure may reduce the aperture ratio of the speaker in comparison with the prior art.

Various embodiments of the present disclosure are to provide a device wearable on the ear, the device having a structure capable of minimizing interference between output sounds in a speaker and a microphone and securing a maximum aperture ratio of the speaker.

Various embodiments of the present disclosure are to provide a device wearable on the ear, the device being capable of improving quality performance and ANC performance by securing a maximum aperture ratio of the speaker.

According to various embodiments of the present disclosure, a wearable device includes: a housing including a first surface facing a first direction and including a speaker nozzle part and a second surface facing a second direction opposite to the first direction and including at least one microphone hole; a speaker disposed in the housing; at least one microphone disposed in the housing to collect an acoustic signal; and a partition wall located between the speaker and the microphone, wherein a first path connecting a first space between the speaker and the partition wall and the speaker nozzle part from the speaker is provided, and a second path separated from the first space by the partition wall and connecting the microphone and the first path is provided.

Advantageous Effects of Invention

A wearable device according to various embodiments of the present disclosure has a structure capable of reducing an influence of an internal output sound introduced into a microphone and securing a maximum aperture ratio of the speaker, so as to improve quality performance or ANC performance.

A wearable device according to various embodiments of the present disclosure has a structure capable of reducing the influence by an output of a speaker, introduced into a microphone, without reducing the output path of the speaker, so as to reproduce an inverse-phase, thereby improving the ANC performance.

A wearable device according to various embodiments of the present disclosure has a microphone placed in a first housing, and thus may reduce the volume of the wearable device.

DETAILED DESCRIPTION

Hereinafter, various embodiments of the present disclosure will be described with reference to the accompanying drawings. However, it is not intended to limit the disclosure by specific embodiment forms, and should be understood to include various modifications, equivalents, and/or alternatives to the corresponding embodiments. In describing the drawings, similar reference numbers may be used to designate similar constituent elements.

Figure 1:
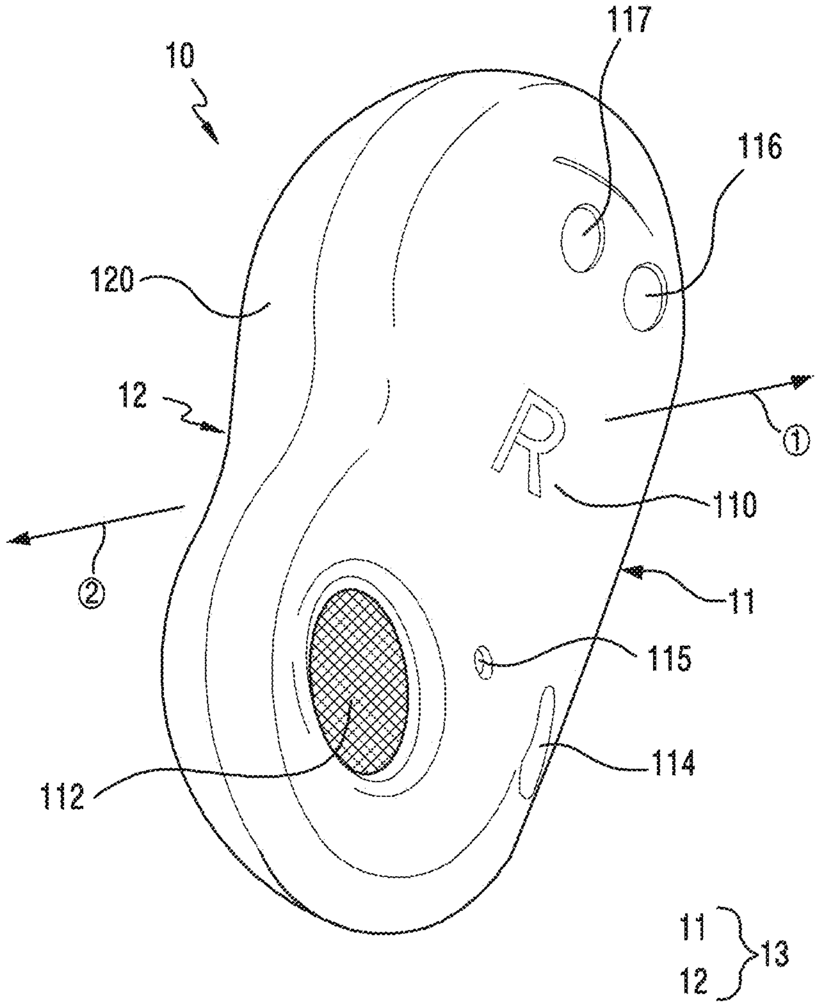
FIG. 1 and FIG. 2 are perspective views illustrating an appearance of a wearable device according to various embodiments of the present disclosure.
Figure 2:
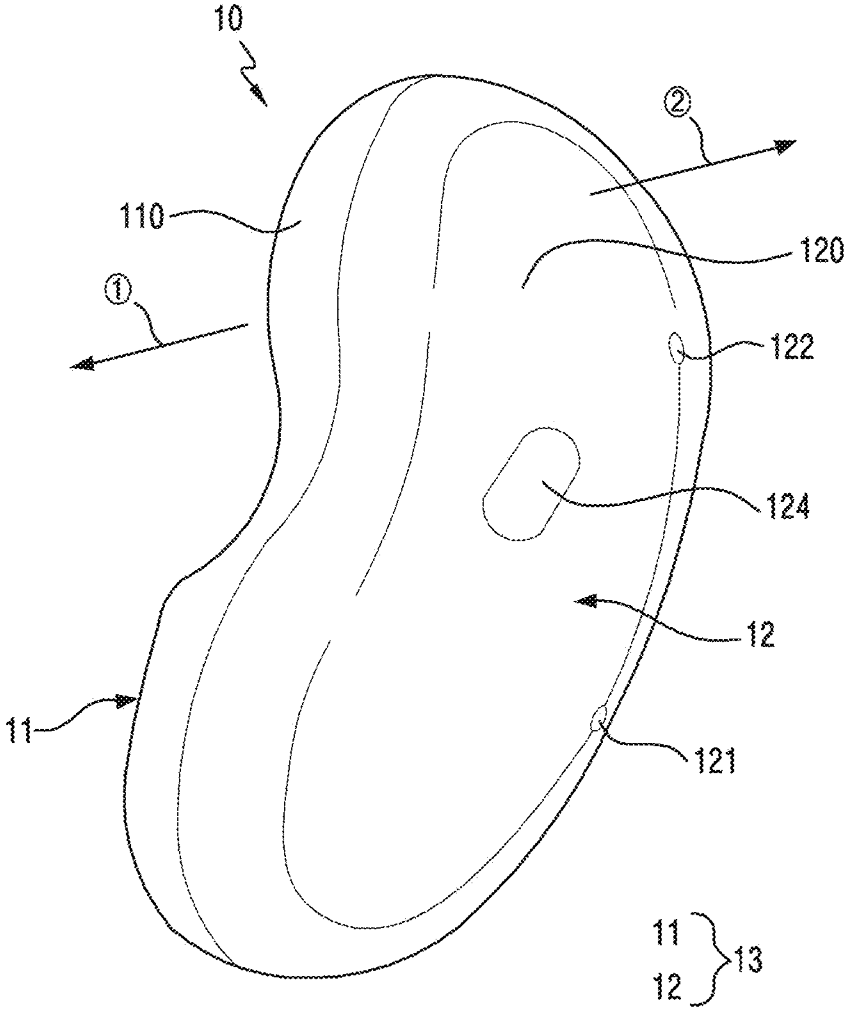
Figure 3:
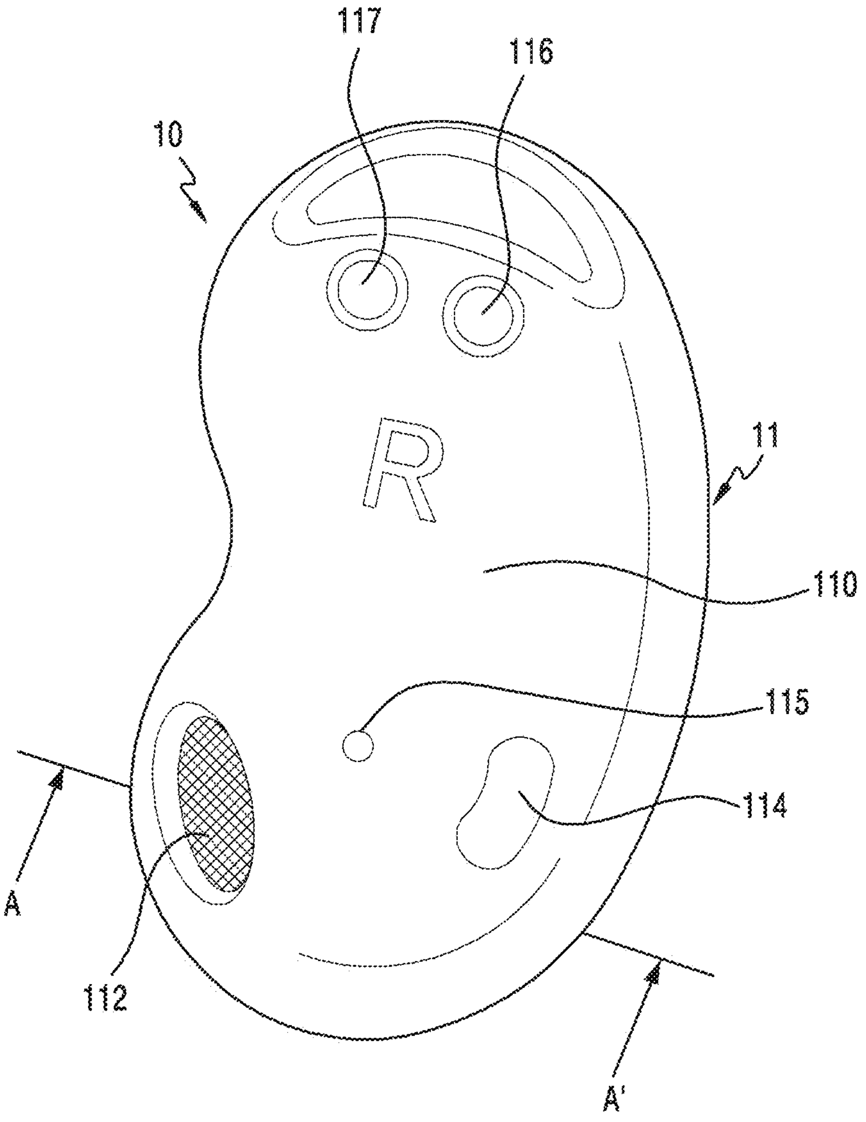
FIG. 3 is a plan view illustrating a wearable device according to various embodiments of the present disclosure.

FIG. 1 and FIG. 2 are perspective views illustrating an appearance of a wearable device according to various embodiments of the present disclosure. FIG. 3 is a plan view illustrating a wearable device according to various embodiments of the present disclosure.

Referring to FIG. 1 to FIG. 3, a wearable device 10 according to an embodiment may be an electronic device that is able to be worn on or in the ear. According to an embodiment, the wearable device 10 may be a device that is able to be worn on an external part of a user's ear. For example, the wearable device 10 is a wearable device that is worn on the right-side ear, and the letter "R" indicating the wearable device worn on the right-side ear may be marked on a first surface 110.

According to an embodiment, the wearable device 10 may include a housing 13 in which a plurality of components are mounted. According to an embodiment, the housing 13 may include a first housing 11 including the first surface 110 facing a first direction ① and a second housing 12 including a second surface 120 facing a second direction ②. The first direction ① may be opposite to the second direction ②. In accordance with some embodiments, a part of each of the first and second surfaces 110 and 120 may include a curved or contoured surface.

According to an embodiment, the first surface 110 of the first housing 11 may include a speaker nozzle part 112, a first port 114, and one or more charging terminals 116, 117. The first port 114 may include a leakage port. According to an embodiment, the speaker nozzle part 112 and the first port 114 may be visually exposed to the outside in a view onto the first surface 110.

According to an embodiment, the speaker nozzle part 112 may be located on an area of the first surface 110 so that sound output from a speaker (e.g., a speaker 20 of FIG. 5) disposed in the housing 13 passes through at least one opening provided in the housing 13 to be output outside the wearable device 10. For example, in some embodiments, the speaker nozzle part 112 may have a plurality of openings and may be made of at least one of a metal material, a polymer material, and a ceramic material. For another example, the speaker nozzle part 112 may include at least one opening and a foreign matter prevention member for preventing foreign matter (e.g., dust or moisture) from being introduced (e.g., a mesh material, a woven material, or the like).

According to an embodiment, a pair of the charging terminals 116 and 117 may be disposed and a contact surface thereof may be exposed to the first surface 110. The charging terminals 116, 117 may be configured to provide electrical contact for the purposes of charging a battery or energy storage device that is configured to supply power to the wearable device 10. Although shown with two charging terminals 116, 117, in other embodiments other configurations and/or mechanisms for electrical charging may be provided without departing from the scope of the present disclosure. For example, in some embodiments, a charging port to receive a charging cable may be provided. In still other embodiments, wireless or non-contact electrical charging may be provided.

According to an embodiment, the wearable device 10 may include a sensor (e.g., a proximity sensor and a biometrics sensor) which determines whether a user wears the wearable device. Referring to FIG. 1, a sensor window 115 for determining whether the user wears the wearable device by a sensor (e.g., a proximity sensor and a biometrics sensor) may be disposed on the first housing 11. According to an embodiment, the sensor window 115 may be located between the speaker nozzle part 112 and the first port 114.

According to an embodiment, the second surface 120 of the second housing 12 may include at least one of microphone holes 121 and 122 and a second port 124. According to an embodiment, the second port 124 is a port related to a speaker output and a port utilized for a low-band characteristic tuning of the speaker, and may be utilized for a speaker back volume space facing the second direction ②.

Figure 4A:
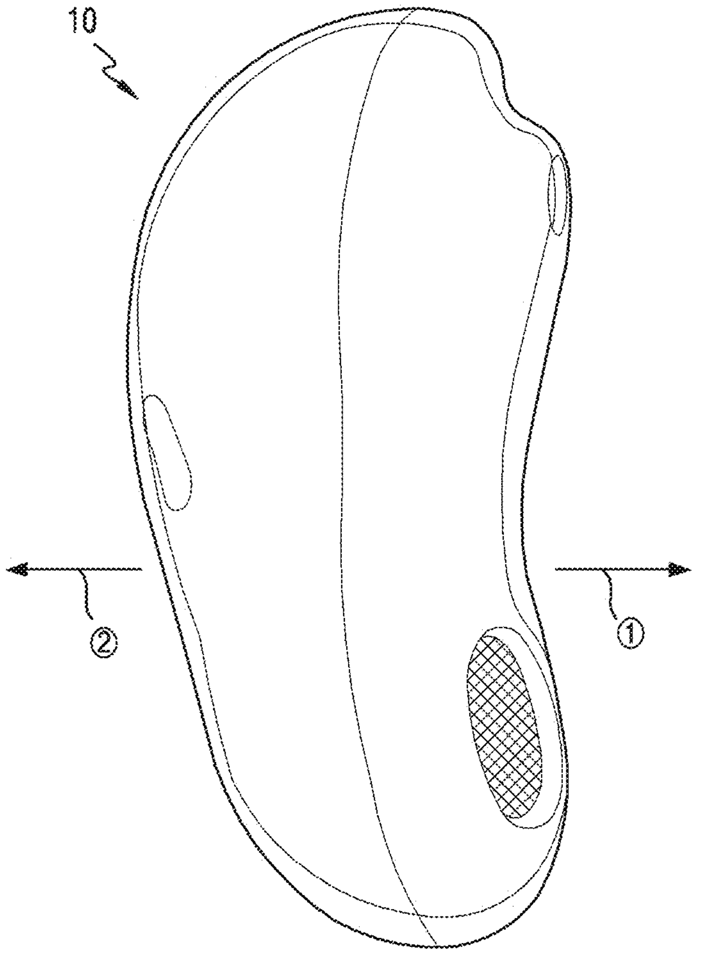
FIG. 4A is a side view illustrating a wearable device worn on the right-side ear according to various embodiments of the present disclosure.
Figure 4B:
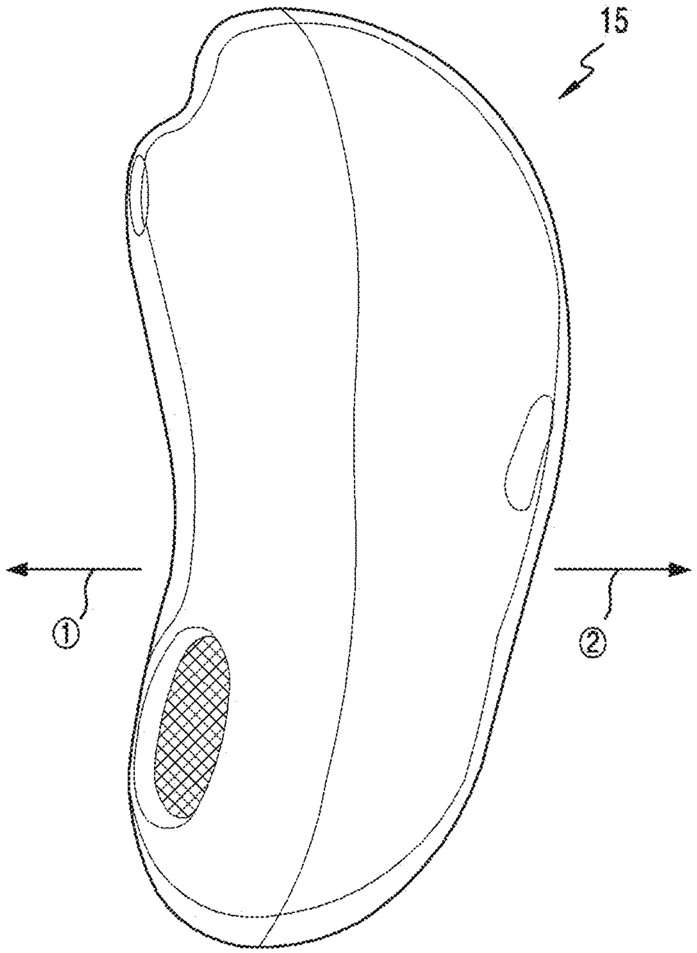
FIG. 4B is a side view illustrating a wearable device worn on the left-side ear.

FIG. 4A is a side view illustrating a wearable device configured to be worn on the right-side ear according to various embodiments of the present disclosure, and FIG. 4B is a side view illustrating a wearable device configured to be worn on the left-side ear.

Referring to FIG. 4A and FIG. 4B, a pair of wearable devices configured to be worn on each ear of a user may be provided, and may include a wearable device 15 worn on the left-side ear and the wearable device 10 worn on the right-side ear.

According to various embodiments, a wearable device may include a head mounted display (HIVID) device such as augmented reality (AR) glasses or a virtual reality (VR) device. For example, the HMD device may include a wearable device which is able to be worn on a user's ear such as the wearable device (e.g., the wearable device 10 or the wearable device 15) illustrated in FIG. 1 to FIG. 4B.

Figure 5A:
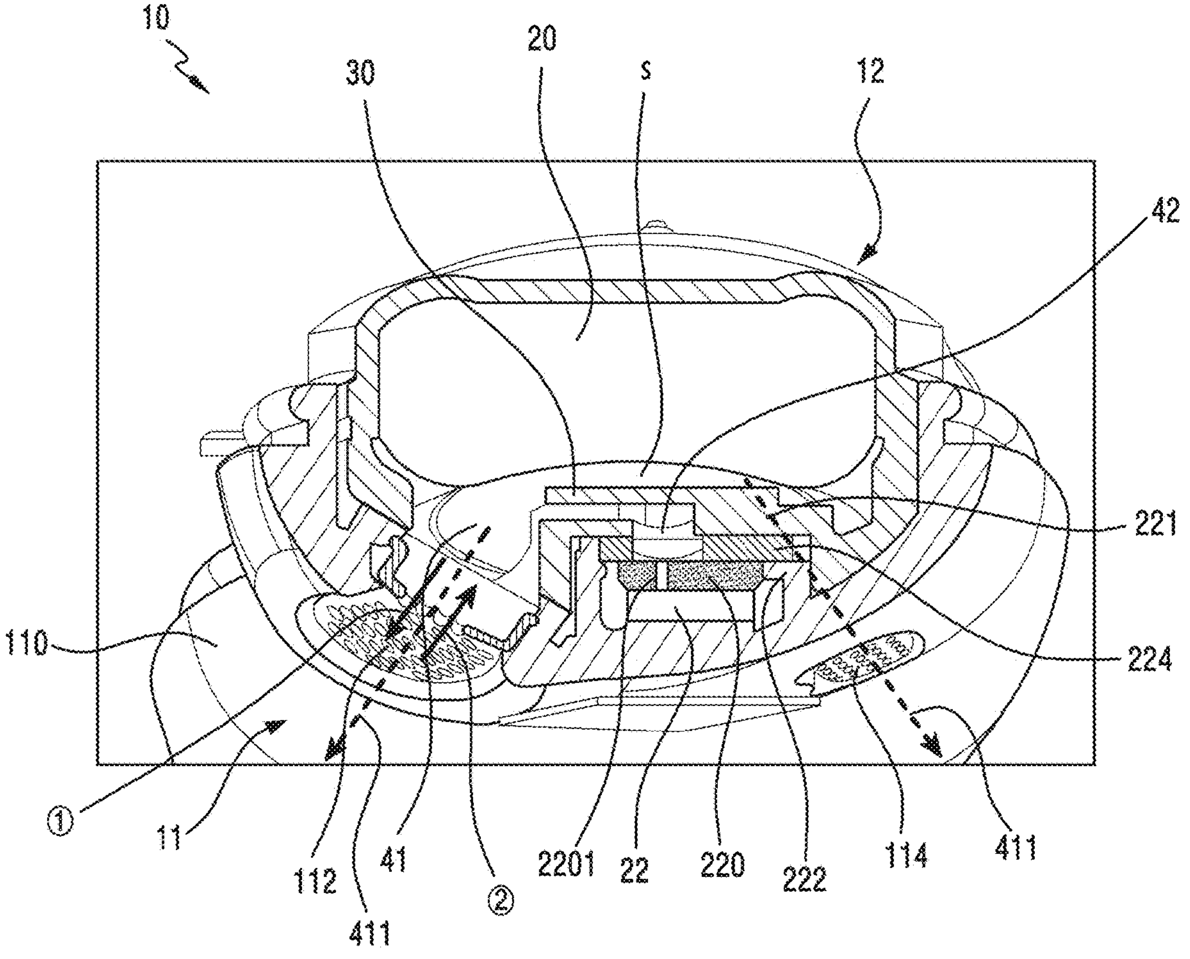
FIG. 5A is a partial cut away perspective view illustrating a part of the wearable device of FIG. 3 taken along line A-A'.
Figure 5B:
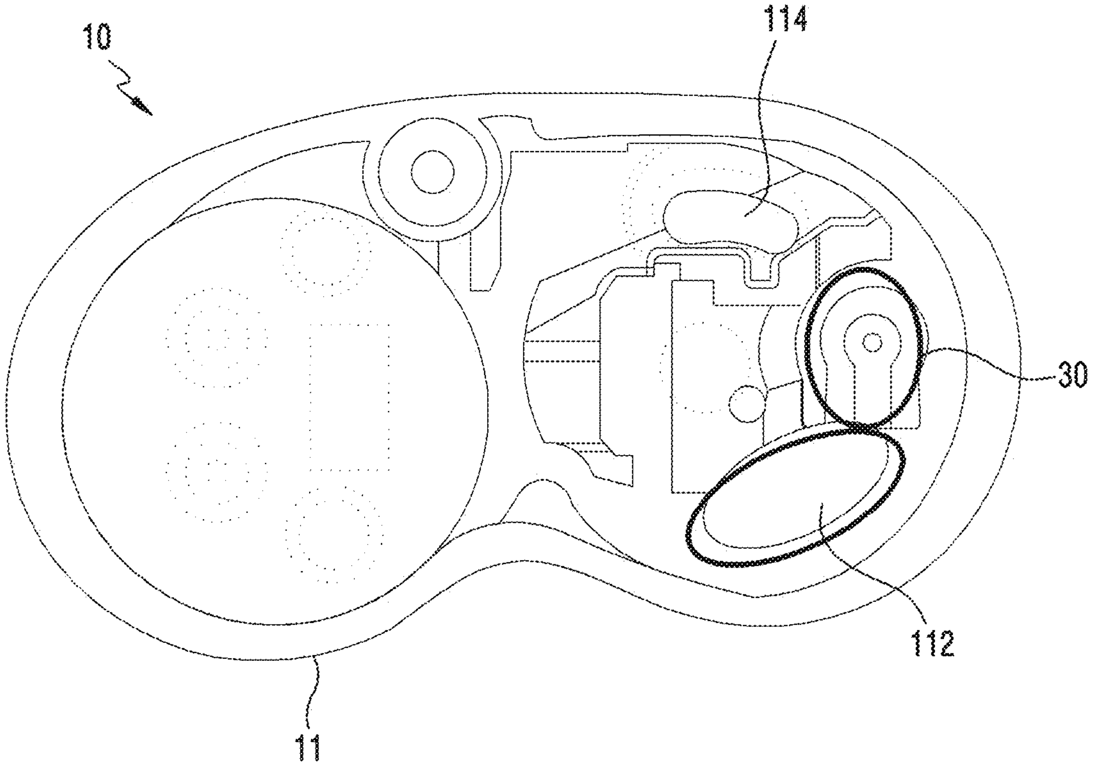
FIG. 5B is a view illustrating a perspective view viewing a first housing of a wearable device according to various embodiments of the disclosure.
Figure 6:
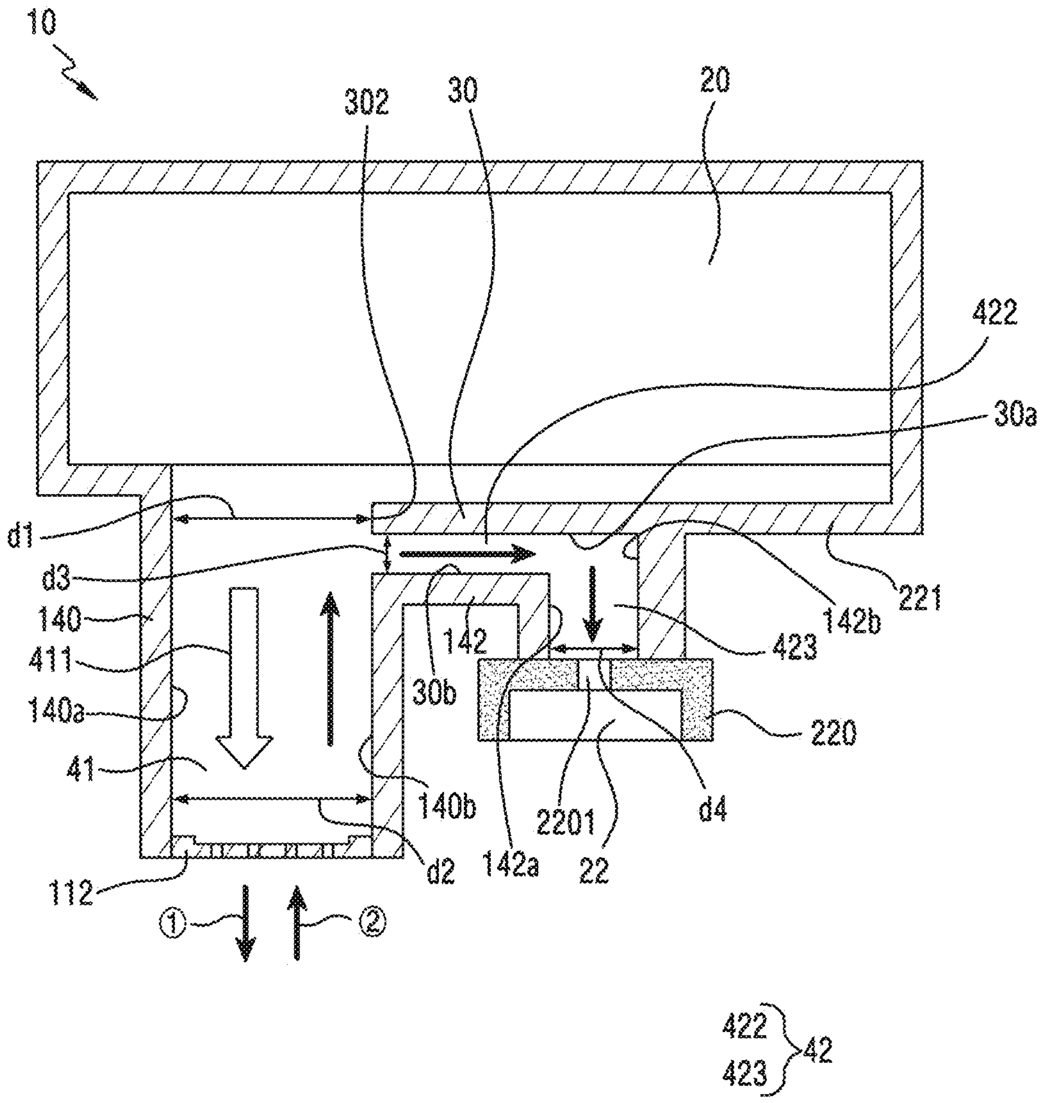
FIG. 6 is an example view schematically illustrating a first and a second path, a speaker and a microphone arrangement of a wearable device according to various embodiments of the disclosure.

FIG. 5A is a partial cut away perspective view illustrating a part of the wearable device of FIG. 3 taken along line A-A'. FIG. 5B is a perspective view viewing a first housing of a wearable device according to various embodiments of the disclosure. FIG. 6 is an example view schematically illustrating a first and a second path, a speaker, and a microphone arrangement status of a wearable device according to various embodiments of the disclosure.

Referring to FIG. 5A to FIG. 6, according to an embodiment, the wearable device 10 may include a speaker 20, a microphone 22, a first path 41, a second path 42, and a partition wall 30.

According to an embodiment, the speaker 20 may include a diaphragm, an acoustic generation part, and a coil (not illustrated). According to an embodiment, the speaker 20 is disposed in the housing 13 to generate sound in the first direction ①, and the generated sound may move towards the outside of the first housing 11 through the first path 41 along an arrow direction 411. According to an embodiment, when the diaphragm of the speaker 20 vibrates, a part of speaker sound moving toward the second direction ② opposite to the first direction ① may be output to the outside through the first port 114 or the second port 124 (shown in FIG. 2). According to an embodiment, the sound output from the speaker 20 may move in the first direction ① through the first path 41 from one or more resonance space(s) to be output to the outside through the speaker nozzle part 112 (e.g., in arrow direction 411), and a part of sound which fails to be output to the outside through the first path 41 may move in the second direction ② to be output to the outside through the first port 114.

According to an embodiment, a microphone 22 is an electronic component for collecting a sound signal introduced from the outside into the housing 13, and at least one thereof may be disposed in the housing 13. In some embodiments, the microphone 22 may be a feedback microphone. According to an embodiment, a feedback microphone may be a microphone for removing outside noise by comparing the sound output from the speaker 20 of the wearable device 10 and sound introduced from the outside of the wearable device 10 when the wearable device 10 performs an ANC operation. According to an embodiment, the microphone 22 may be disposed at a location spaced apart from the speaker 20 and disposed at a location spaced apart from the partition wall 30. In some embodiments, the partition wall 30 may be located between the microphone 22 and the speaker 20.

According to an embodiment, a resonance space "s" may be located in the first direction ① of the speaker 20. The partition wall 30 may be located between the resonance space "s" and the second path 42 and provided to allow a sound from the speaker 20 to be input to the microphone 22. According to an embodiment, the partition wall 30 may be made by a separate member and attached to an inner support member 221 to provide or define the second path 42. According to an embodiment, the partition wall 30 and the inner support member 221 may be integrally formed. According to an embodiment, the thickness of the partition wall 30 may be different from the thickness of the inner support member 221.

According to an embodiment, an additional resonance space may be further included in the second direction ② of the speaker 20. For example, an additional resonance space (not illustrated) may be located in the second direction ② of the diaphragm of the speaker 20.

According to an embodiment, the first path 41 may be provided between the speaker nozzle part 112 and the speaker 20. According to an embodiment, the first path 41 is a path through which speaker sound which is the sound generated from the speaker 20 to be output to the outside by passing through the speaker nozzle part 112 passes, and may be provided as a duct structure 140 (e.g., as illustrated in FIG. 6). According to an embodiment, the first path 41 may be provided in the inner support member 221, for example, an inner support frame or a bracket, of the housing 13. According to an embodiment, the first path 41 may face the first direction ①. In some embodiments, the first path 41 may have a linear shape or a curved shape, or a combination thereof.

According to an embodiment, the second path 42 may diverge from the first path 41 and may be provided between the first path 41 and the microphone 22. According to an embodiment, the second path 42 is a path through which a sound signal introduced through the first path 41 reaches the microphone 22 passes, and may be provided as a duct structure 142. According to an embodiment, the second path 42 may be provided in a part of the inner support member 221, for example, an inner support frame or a bracket, of the housing. According to an embodiment, the second path 42 may include a third path 422 diverging from the first path 41, and a fourth path 443 extending from the third path 442 and directing a sound signal moved through the third path 422 to the microphone 22. That is, the second path 42 may be formed or defined by two portions 422, 433, with the third path 422 (of the second path 42) extending between the first path 41 and the second portion of the second path 42 (i.e., fourth path 423), and the fourth path 423 extends from the third path 422 and is arranged to direct sound toward the microphone 22. In some embodiments, the third path 422 and the fourth path 423 may be arranged in different directions.

According to an embodiment, the second path 42 may diverge from the first path 41, and a cross sectional size of the second path 42 (e.g., d3 and/or d4) may be smaller than a cross sectional size of the first path 41 (e.g., d1 and/or d2). That is, the cross-sectional dimensions of the second path 42 (and each of third path 422 and fourth path 423 thereof) is less than the cross-sectional dimensions of the first path 41.

According to an embodiment, when it is defined that a distance (e.g., a width) between a first surface 140*a* of the duct structure 140 defining the first path 41 and one end part 302 of the partition wall 30 is a first distance d1 and a distance (e.g., a width) between the first surface 140*a* of the duct structure 140 and a second surface 140*b* of the duct structure 140 in a direction facing the first surface 140*a* is a second distance d2, the first distance d1 may be substantially equal to or larger than the second distance d2. According to an embodiment, when a distance between a third surface 30*a* of the duct structure 142 defining the third path 422 and a fourth surface 30*b* of the duct structure 142 in a direction facing the third surface 30*a* is a third distance d3, the third distance d3 may be smaller than each of the first distance d1 and the second distance d2. According to an embodiment, when a distance between a fifth surface 142*a* of the duct structure 142 defining a fourth path 423 and a sixth surface 142*b* of the duct structure 142 in a direction facing the fifth surface 142*a* is a fourth distance d4, the fourth distance d4 may be smaller than each of the first distance d1 and the second and d2.

According to an embodiment, the third path 422 may be approximately perpendicular to the first direction ①, and the fourth path 423 may be approximately perpendicular to the third path 422 and face the first direction ①. For example, the third path 423 may be substantially parallel to the first path 41, and may be oriented in the first direction ①.

According to an embodiment, the speaker sound output from the speaker 20 though the first path 41 may move in the first direction ① and may be output to the outside of the wearable device 10. Additionally, a sound signal (or an external sound) may be introduced in the second direction ① from the outside of the wearable device 10. According to an embodiment, at least a part of the first path 41 may share at least a part of a path from which the speaker sound output from the speaker 20 is output and a path through which a sound signal outside the wearable device 10 is introduced into the microphone 22. Therefore, at least a part of the sound signal introduced into the housing 13 through the speaker nozzle part 112 may pass through a part of the first path 41, move toward the second path 42, and be finally collected in the microphone 22.

According to an embodiment, the partition wall 30 may be a member for spatially partitioning a mounting space of the speaker 20 and a mounting space of the microphone 22, and may extend (internally) from a part of the housing 13 toward the first path 41. According to an embodiment, the partition wall 30 may be a member for spatially partitioning the second path 42 provided to allow a sound to be input to a speaker resonance space "s" and the microphone 22 (e.g., as shown in FIG. 5A). The partition wall 30 may extend from a part of the housing 13 toward the first path 41. According to an embodiment, the partition wall 30 may be formed as an injection structure for spatially partitioning the first path 41 and the second path 42. For example, in some embodiments, the partition wall 30 may be integrally injection-molded as a part of the housing 13, or in other embodiments, the partition wall 30 may be made of a separate material to be coupled to the housing 13. In some non-limiting embodiments, the partition wall 30 may have a thin plate shape. According to an embodiment, the partition wall 30 may be coupled to a part of a support member of the first housing 11 or a part of a support member of the second housing 12 through an adhesive, bonding, mechanical coupling, or the like.

According to an embodiment, the partition wall 30 may protrude from the inner support member (e.g., a support frame or a bracket) of the housing 13 toward the first path 41, and may extend to a length in which the end part 302 of the partition wall 30 does not protrude within the first path 41. For example, the first distance d1 between the end part 302 and the first surface 140*a* of the first path 41 may be substantially identical to the second distance d2 between the first surface 140*a* of the first path 41 and the second surface 140*b* of the first path 41. In accordance with some embodiments, the end part 302 of the partition wall 30 may extend into the first path 41 in a protruding shape and a partial area of the first path 41 may be blocked to cause an obstacle to outputting speaker sound from the speaker 20.

According to an embodiment, the partition wall 30 may be disposed to be approximately parallel to the speaker 20 and disposed to be approximately parallel to the microphone 22. That is, an orientation of the partition wall 30 may be such that it provides a wall or barrier between the speaker 20 and the microphone 22.

According to an embodiment, the microphone 20 may be disposed at a part of the inner support structure 221 of the housing 13 while at least a part thereof is wound or enclosed by a microphone sealing member 220. According to an embodiment, the microphone sealing member 220 may elastically support a mounting structure of the microphone 20 and may seal the microphone 20 from the outside.

According to an embodiment, a microphone hole 2201 may be provided through the microphone sealing member 220 to provide a path for sound to travel from the fourth path 423 and interact with the microphone 22.

According to an embodiment, when the first housing 11 and the second housing 12 are assembled, an adhesive member 224 (e.g., shown in FIG. 5A) may be attached between a part of a support member 222 of the first housing 11 and a part of the support member 221 of the second housing 12, in order to define a part of the second path 42. The adhesive member 224 may be formed from rubber tape or the like. According to an embodiment, the adhesive member 224 may be disposed on a boundary part of the first housing 11 and the second housing 12 to seal at least a part of the duct structure 142 defining the second path 42.

Figure 7:
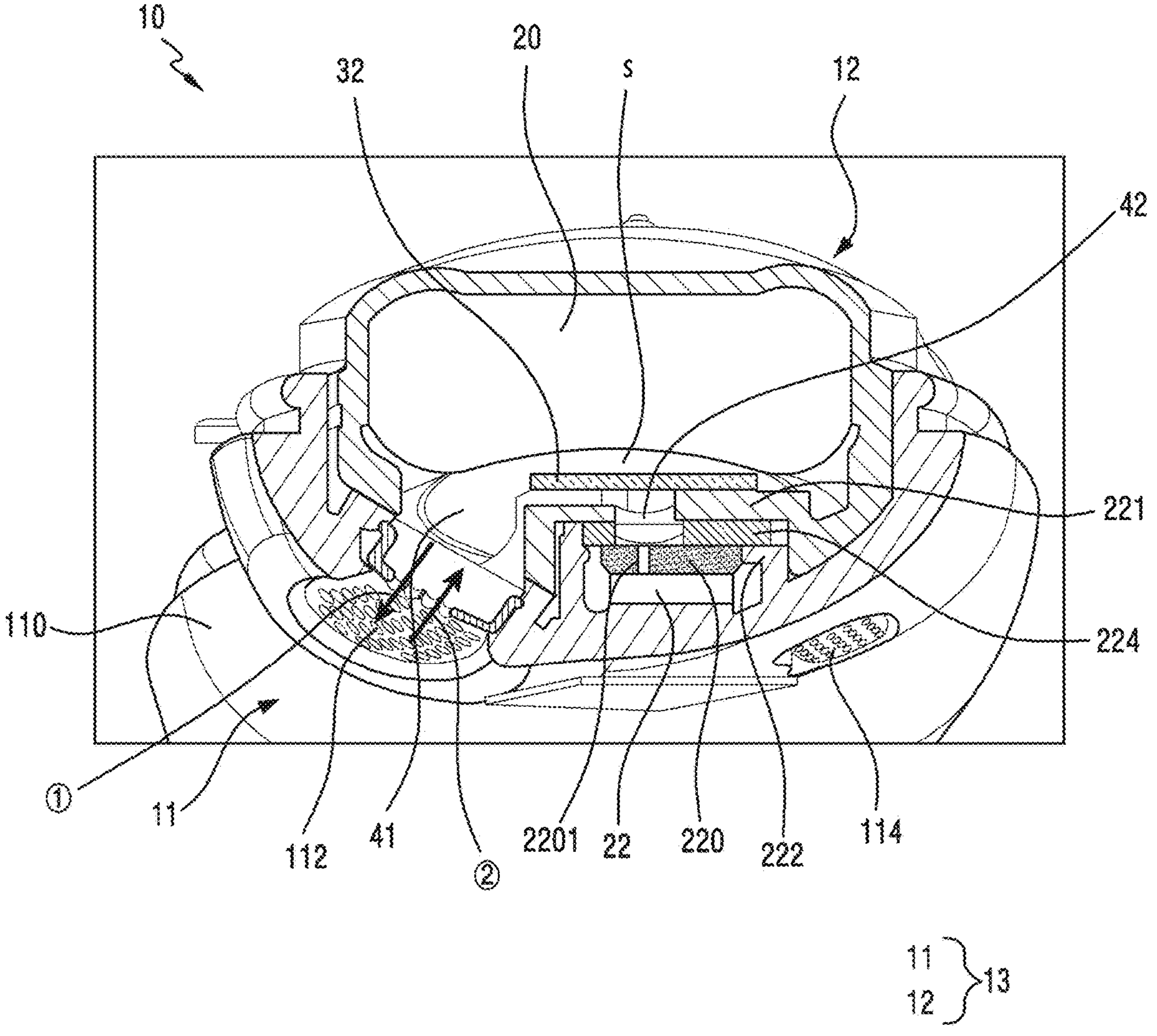
FIG. 7 is a partial cut away cross-sectional view illustrating a structure of a partition wall according to various embodiments of the disclosure.

Referring to FIG. 7, a partition wall 32 according to an embodiment may be made by a separate member to be attached to a portion of the housing 13 (e.g., a part of second housing 12). According to an embodiment, the partition wall 32 may be separately manufactured to be attached, coupled, or injection-molded to the inner support member 221 which is a part of the second housing 12. In accordance with some embodiments of the present disclosure, a material of the partition wall 32 may be different from a material of the inner support member 221.

Figure 8A:
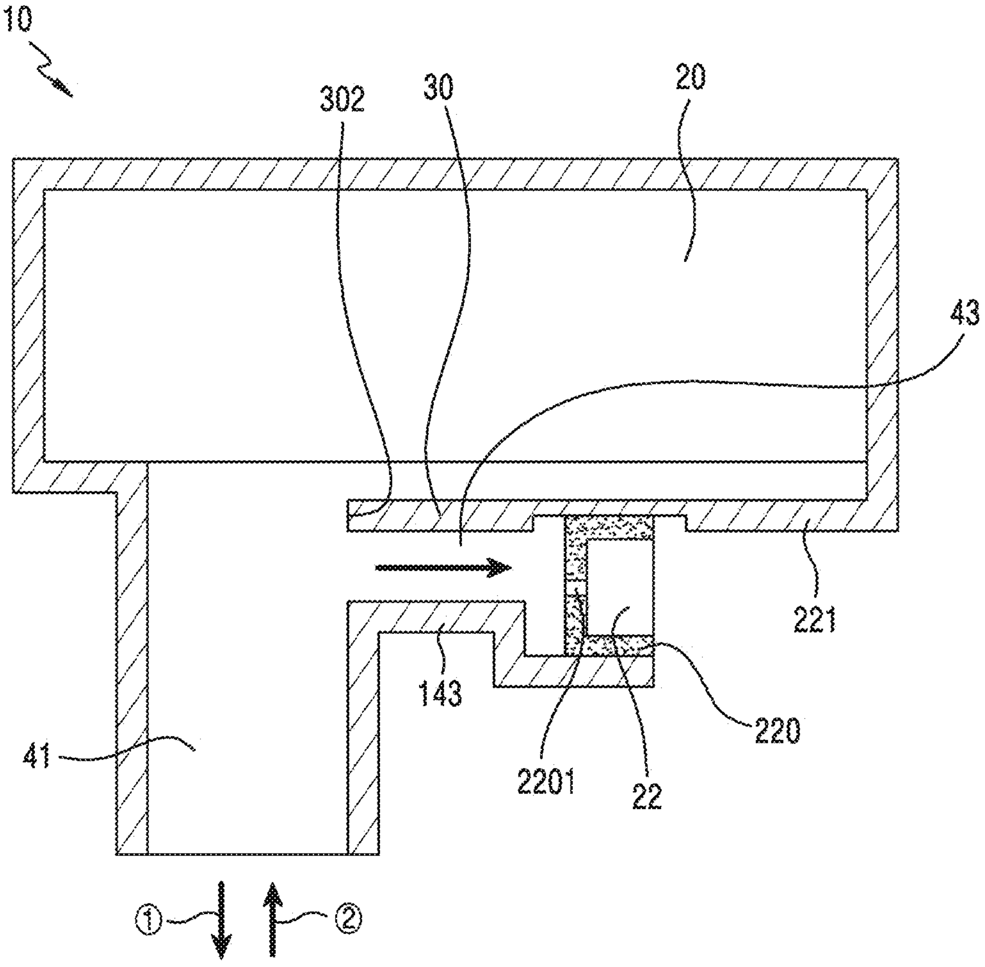
FIG. 8A, FIG. 8B, and FIG. 8C are cross-sectional views schematically illustrating a second path according to various embodiments of the disclosure.

Referring to FIG. 8A, a second path 43 according to an embodiment may diverge from the first path 41, face a direction perpendicular to the first path 41, be provided by a linear duct structure 143, and extend in a direction facing the microphone 22. According to an embodiment, the microphone 22 may be disposed to frontally and directly face the second path 43. According to an embodiment, a sound signal moved through the second path 43 may be collected in the microphone 22 through the microphone hole 2201. According to an embodiment, a direction in which the sound signal output from the speaker 20 may be substantially perpendicular to a direction in which the sound signal moves toward the microphone 22.

Figure 8B:
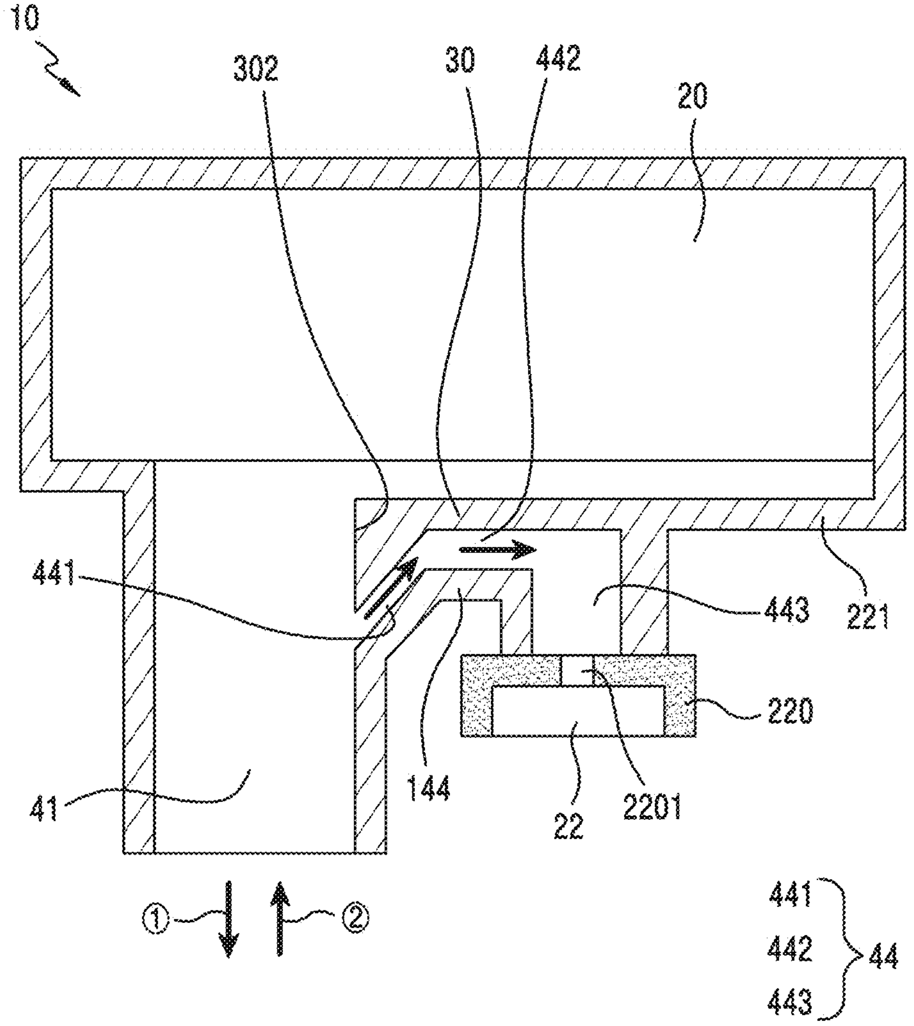

Referring to FIG. 8B, the second path 44 according to an embodiment may be defined by a duct structure 144, and may include a third path 441 diverging in a direction inclined from the first path 41, a fourth path 442 linearly extending from the third path 441, and a fifth path 443 extending in a right-angle direction from the fourth path 442 to be connected with the microphone 22. According to an embodiment, a sound signal having passed through the fifth path 443 may be collected in the microphone 22 through the microphone hole 2201. For example, the third path 441 diverging from the first path 41 may include an inclination to reduce an introduction of the sound, which is output from the speaker 20 and moves in a first direction, into the second path 44. That is, the third path 441 may be angled to preferentially receive sound received from the second direction ②, and to minimize sound traveling in the first direction ①.

Figure 8C:
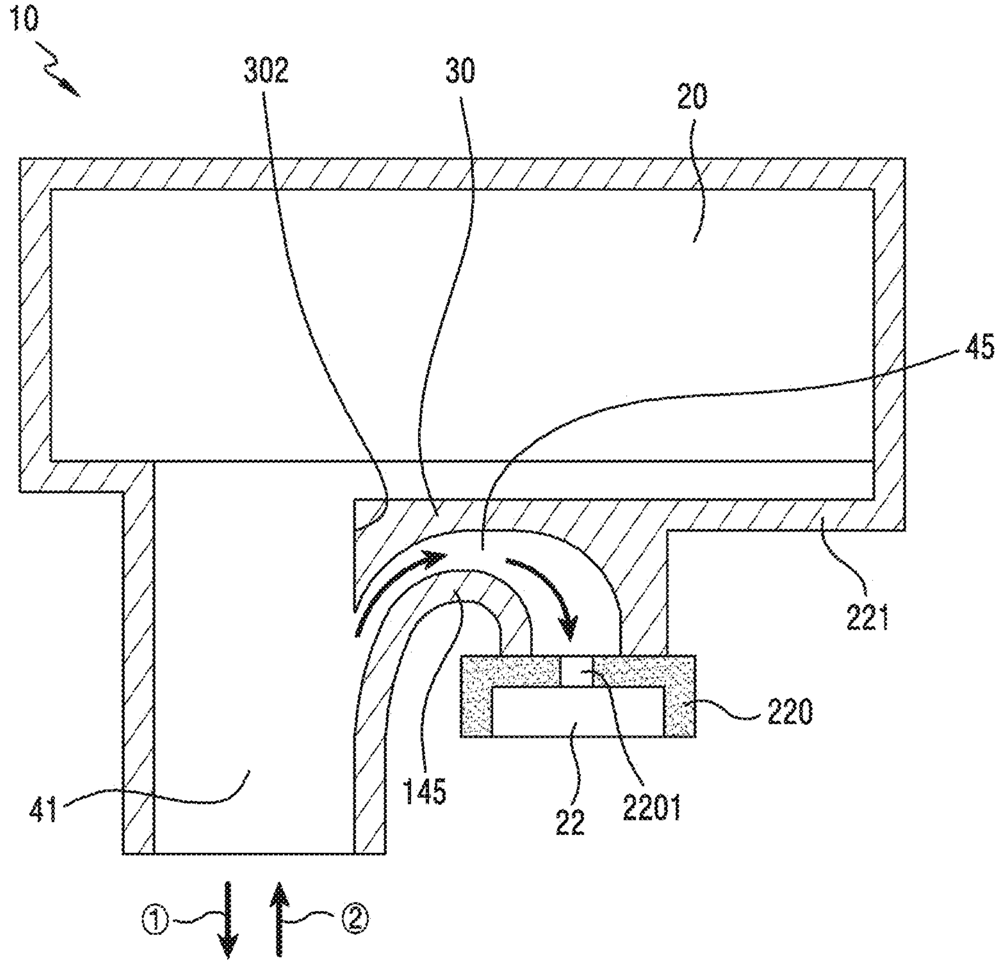

Referring to FIG. 8C, a second path 45, according to an embodiment, diverges from the first path 41 and may be defined by a duct structure 145 which extends in a curved shape. In the illustrative configuration, the second path 45 has the letter "C" shape, contour, or curvature, in which one end thereof may be spatially connected to the first path 41 and the other end thereof may be connected to the microphone hole 2201. According to an embodiment, a sound signal having passed through the second path 45 may be collected in the microphone 22 through the microphone hole 2201. Similar to the configuration of FIG. 8B, the second path 45 of FIG. 8C may be angled or oriented to preferentially receive sound received from the second direction ①, and to minimize sound traveling in the first direction ①. The curvature of the second path 45 may be configured to direct sound from the first path 41 to the microphone 22 in a substantially smooth or continuous curve. In other embodiments, the second path 45 may include a substantially straight portion between two curved ends (e.g., a first curved end proximate the first path 41 and a second curved end proximate the microphone 22).

Figure 9:
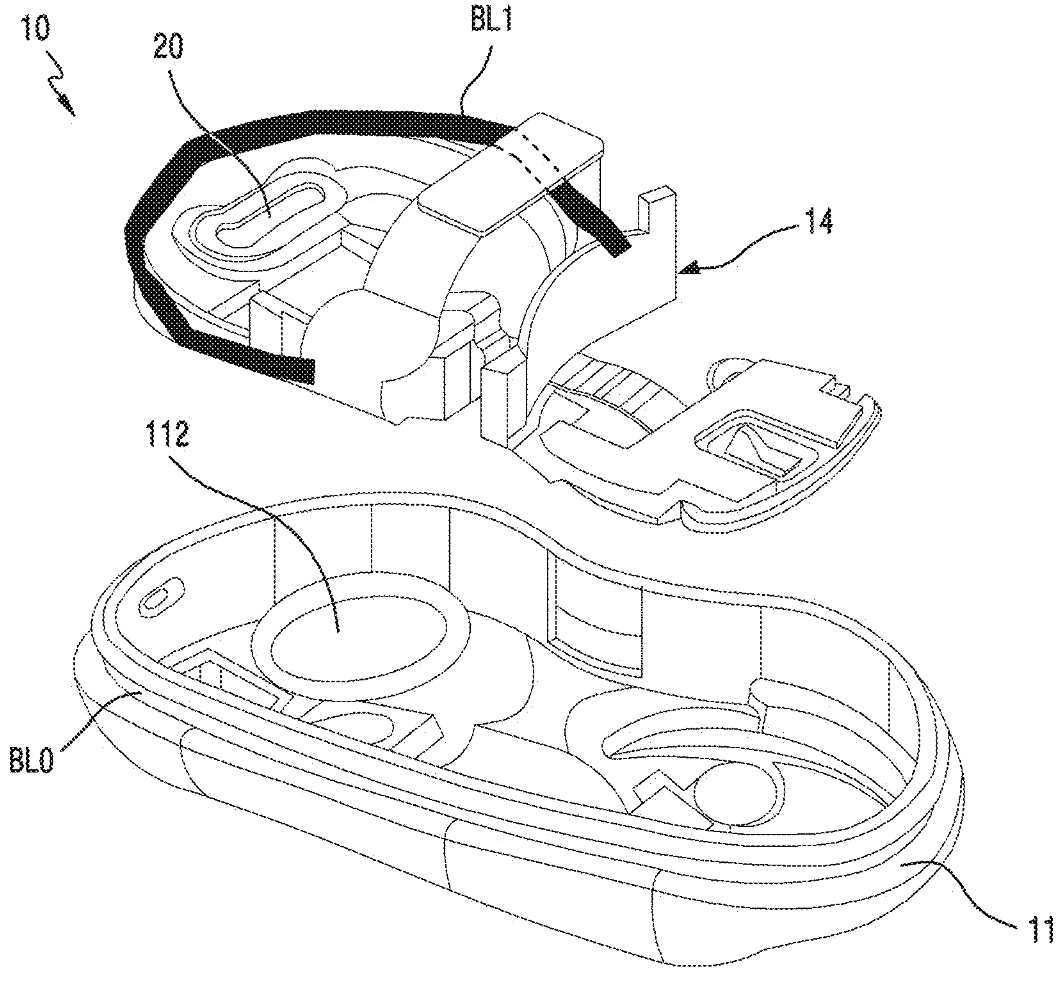
FIG. 9 is an exploded perspective view illustrating a wearable device according to various embodiments of the disclosure.

Referring to FIG. 9, according to an embodiment, when the first housing 11 and the second housing (not shown in FIG. 9) are assembled, a boundary part between the first housing 11 and the second housing may block an outside sound signal introduction by a bonding process. For example, in FIG. 9, reference signals BL0 and BL1 may be an adhesive layer (e.g., an adhesive member). The adhesive layers/members BL0, BL1 may be arranged to provide a seal between the first housing 11 and the second housing, or a bracket assembly 14, as shown in FIG. 9. The bracket assembly 14 may be housed within or between the first housing 11 and the second housing.

According to an embodiment, the bracket assembly 14 to which at least one component (e.g., the speaker 20, the microphone 22, or a battery (not illustrated)) of the wearable device 10 is assembled may be attached to the first housing 11 (e.g., as shown in FIG. 9). The first housing 11 and the second housing 12 may then be bonded together, with the adhesive layers/members BL0, BL1 providing bonding and sealing between the components of the wearable device 10. The resonance space "s" of the speaker 20 and the microphone 22 are spatially separated by the partition wall 30, so that the first path 41 and the second path 42 may be defined. The duct structure of the second path 42 may be secured by the adhesive member 224 (e.g., silicon rubber) disposed between the inner support members (e.g., the bracket assembly 14) of the first housing 11 and/or the second housing 12 (e.g., as shown in FIGS. 5A, 7). In accordance with some embodiments, the first housing 11, the second housing 12, and/or the bracket assembly 14 may be coupled by a bonding process, so that the outside sound signal fails to pass through the second path 42 and introduction thereof into the microphone 22 through another gap may be reduced.

Figure 10:
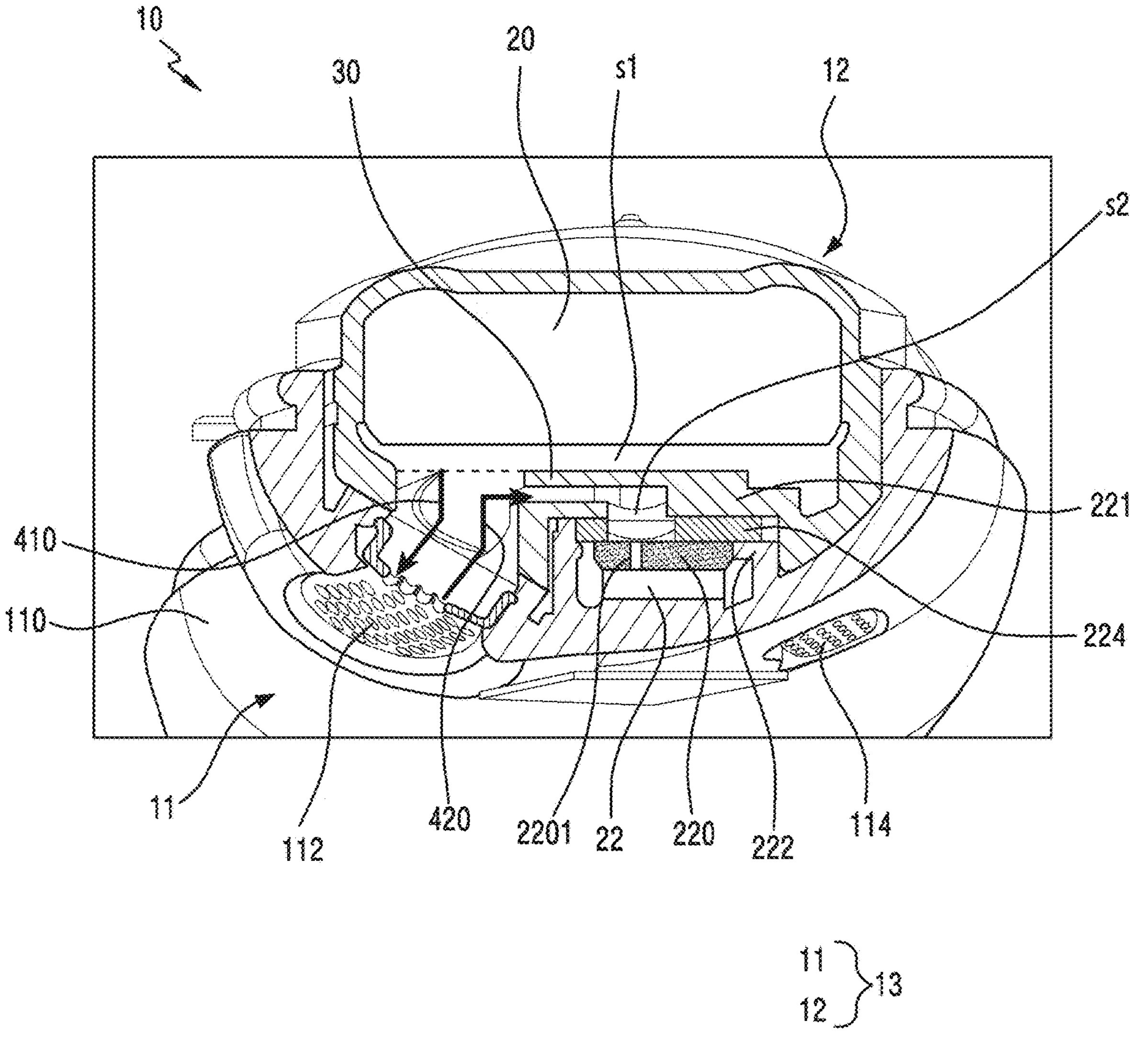
FIG. 10 is a partial cut away perspective view illustrating a wearable device according to various embodiments of the disclosure.

Referring to FIG. 10, the wearable device 10 according to an embodiment may include the housing 13, the speaker 20, the microphone 22, a first path 410, a second path 420, a first space s1 and a second space s2, and a partition wall 30.

According to an embodiment, the first space s1 may be defined between the speaker 20 and the partition wall 30, and the second space s2 may be defined between the partition wall 30 and the microphone 22. In accordance with some embodiments, at least a part of the first space s1 may be a resonance space of the speaker 20, and at least a part of the second space s2 may be a space through which the collected acoustic signal passes.

According to an embodiment, the first path 410 may be a path between the first space s1 and the speaker nozzle part 112, and the second path 420 may be a path between the speaker nozzle part 112 and the second space s2. According to an embodiment, at least a part of the first path 410 and the second path 420 may include the same path, and at least a part thereof may be a shared path.

According to an embodiment, a first acoustic signal output from the speaker 20 may pass along the first path 410 and may be output to the outside of the speaker nozzle part 112, and a second acoustic signal may be input to the microphone 22 along the second path 420 by which the microphone 22 and the speaker nozzle part 122 are connected.

According to an embodiment, a wearable device (e.g., the wearable device 10 of FIG. 1) includes: a housing (e.g., the housing 13 of FIG. 1) including a first surface facing a first direction (e.g., the first direction ① of FIG. 1) and including a speaker nozzle part (e.g., the speaker nozzle part 112 of FIG. 5A) and a second surface facing a second direction (e.g., the second direction ② of FIG. 1) opposite to the first direction and including at least one microphone hole; a speaker (e.g., the speaker 20 of FIG. 5A) disposed in the housing (e.g., the housing 13 of FIG. 1); at least one microphone (e.g., the microphone 22 of FIG. 5A) disposed in the housing (e.g., the housing 13 of FIG. 1) to collect an acoustic signal; and a partition wall (e.g., the partition wall 30 of FIG. 5A) located between the speaker (e.g., the speaker 20 of FIG. 5A) and the microphone (e.g., the microphone 22 of FIG. 5A), wherein a first path (e.g., the first path 41 of FIG. 5A) connecting a first space (e.g., the first space (s) of FIG. 5A) between the speaker (e.g., the speaker 20 of FIG. 5A) and the partition wall (e.g., the partition wall 30 of FIG. 5A) and the speaker nozzle part (e.g., the speaker nozzle part 112 of FIG. 5A) from the speaker (e.g., the speaker 20 of FIG. 5A) may be provided, and a second path (e.g., the second path 42 of FIG. 5A) separated from the first space (e.g., the first space (s) of FIG. 5A) by the partition wall (e.g., the partition wall 30 of FIG. 5A) and connecting the microphone (e.g., the microphone 22 of FIG. 5A) and the first path (e.g., the first path 41 of FIG. 5A) may be provided.

According to an embodiment, the partition wall (e.g., the partition wall 30 of FIG. 5A) may spatially partition the first path (e.g., the first path 41 of FIG. 5A) and the second path (e.g., the second path 42 of FIG. 5A).

According to an embodiment, the partition wall (e.g., the partition wall 30 of FIG. 5A) may extend from a part of the housing (e.g., the housing 13 of FIG. 1) toward the first path (e.g., the first path 41 of FIG. 5A).

According to an embodiment, a distance between an end part of the partition wall (e.g., the partition wall 30 of FIG. 5A) and a first surface of a duct structure defining the first path (e.g., the first path 41 of FIG. 5A) may be equal to or larger than a distance between the first surface of the duct structure and a second surface of the duct structure.

According to an embodiment, the partition wall (e.g., the partition wall 30 of FIG. 5A) may be an injection-formed object which is integrally provided in the housing (e.g., the housing 13 of FIG. 1).

According to an embodiment, the partition wall (e.g., the partition wall 30 of FIG. 5A) may be made by a separate member to be attached to the housing (e.g., the housing 13 of FIG. 1).

According to an embodiment, the first path (e.g., the first path 41 of FIG. 5A) may include a path through which an acoustic signal which is introduced into the housing (e.g., the housing 13 of FIG. 1) passes.

According to an embodiment, the second path (e.g., the second path 42 of FIG. 5A) may include: a third path substantially perpendicular to the first direction; and a fourth path facing the first direction and connecting the third path and the microphone (e.g., the microphone 22 of FIG. 5A).

According to an embodiment, the speaker (e.g., the speaker 20 of FIG. 5A) may be oriented approximately parallel to an orientation of the microphone (e.g., the microphone 22 of FIG. 5A).

According to an embodiment, the partition wall (e.g., the partition wall 30 of FIG. 5A) may be oriented substantially parallel to an orientation of the speaker (e.g., the speaker 20 of FIG. 5A) or an orientation of the microphone (e.g., the microphone 22 of FIG. 5A).

According to an embodiment, a direction in which the first path (e.g., the first path 41 of FIG. 5A) faces may be approximately perpendicular to a direction in which the second path (e.g., the second path 42 of FIG. 5A) faces.

According to an embodiment, a first duct defining the first path (e.g., the first path 41 of FIG. 5A) may be approximately perpendicular to a second duct defining the second path (e.g., the second path 42 of FIG. 5A).

According to an embodiment, a first port disposed adjacent to the speaker nozzle part (e.g., the speaker nozzle part 112 of FIG. 5A) may be disposed on the second surface of the housing (e.g., the housing 13 of FIG. 1).

According to an embodiment, the housing (e.g., the housing 13 of FIG. 1) may be worn external to a user's ear.

According to an embodiment, a wearable device (e.g., the wearable device 10 of FIG. 1) may include: a housing (e.g., the housing 13 of FIG. 1) including a first surface facing a first direction and including a speaker nozzle part (e.g., the speaker nozzle part 112 of FIG. 5A) and a second surface facing a second direction (e.g., the second direction ② of FIG. 1) opposite to the first direction (e.g., the first direction ① of FIG. 1) and including at least one microphone hole; a speaker (e.g., the speaker 20 of FIG. 5A) disposed in the housing (e.g., the housing 13 of FIG. 1); an electronic component disposed in parallel to a part spaced apart from the speaker (e.g., the speaker 20 of FIG. 5A) to collect an acoustic signal; a first path (e.g., the first path 41 of FIG. 5A) connecting the speaker nozzle part (e.g., the speaker nozzle part 112 of FIG. 5A) from the speaker (e.g., the speaker 20 of FIG. 5A); a second path (e.g., the second path 42 of FIG. 5A) diverging from the first path (e.g., the first path 41 of FIG. 5A) and connecting the electronic component and the first path (e.g., the first path 41 of FIG. 5A); and a partition wall (e.g., the partition wall 30 of FIG. 5A) spatially partitioning a resonance space of the speaker (e.g., the speaker 20 of FIG. 5A) and the electronic component.

According to an embodiment, the partition wall (e.g., the partition wall 30 of FIG. 5A) extends from a part of the housing (e.g., the housing 13 of FIG. 1) toward the first path (e.g., the first path 41 of FIG. 5A) to spatially partition the first path (e.g., the first path 41 of 5A) and the second path (e.g., the second path 42 of FIG. 5A), and does not protrude within the first path (e.g., the first path 41 of 5A).

Various embodiments disclosed in this specification and drawings merely present specific examples in order to easily describe the technical features of the present disclosure and to help understanding of the present disclosure, and are not intended to limit the scope of the embodiments. Accordingly, the scope of the present disclosure should be construed in such a manner that, in addition to the embodiments disclosed herein, all changes or modifications derived from the technical idea of the present disclosure are included in the scope of the present disclosure.

What is claimed is:

1. A wearable device comprising:

a housing comprising a first surface facing a first direction and having a speaker nozzle part exposed to an outside and a second surface facing a second direction opposite to the first direction and having at least one microphone hole;

a speaker disposed in the housing;

a microphone disposed in the housing to collect an acoustic signal; and a partition wall arranged between the speaker and the microphone, wherein a first path is defined to connect the speaker nozzle part and a first space between the speaker and the partition wall, wherein the housing further comprises a protruding portion forming an entirety of the first path, wherein an end of the protruding portion surrounds the speaker nozzle part, wherein the microphone is disposed outside the protruding portion, wherein a second path is defined to connect the microphone and the first path and diverges from the first path along the partition wall, wherein the second path is separated from the first space by the partition wall, and wherein the acoustic signal is transmitted from the speaker nozzle part to the microphone along the partition wall through an opening formed at an outer side wall of the protruding portion.

2. The wearable device of claim 1, wherein the partition wall extends from a part of the housing toward the first path.

3. The wearable device of claim 1, wherein a distance between an end part of the partition wall and a first surface of a duct structure defining the first path is equal to or larger than a distance between the first surface of the duct structure and a second surface of the duct structure, wherein the second surface of the duct structure is opposite the first surface of the duct structure relative to the first path, wherein the duct structure corresponds to the protrusion portion.

4. The wearable device of claim 1, wherein the partition wall is an injection-formed object which is integrally provided in the housing.

5. The wearable device of claim 1, wherein the partition wall comprises a separate member to be attached to the housing.

6. The wearable device of claim 1, wherein the first path comprises a path through which an acoustic signal introduced into the housing passes.

7. The wearable device of claim 1, wherein the second path comprises:

a third path substantially perpendicular to the first direction; and a fourth path facing the first direction and connecting the third path and the microphone.

8. The wearable device of claim 1, wherein the partition wall is oriented substantially parallel to an orientation of at least one of the speaker and the microphone.

9. The wearable device of claim 1, wherein a direction in which the first path faces is approximately perpendicular to a direction in which the second path faces.

10. The wearable device of claim 9, wherein a first duct defining the first path is oriented approximately perpendicular to a second duct defining the second path, wherein the first duct corresponds to the protrusion portion.

11. The wearable device of claim 1, further comprising a first port disposed on the second surface of the housing and adjacent to the speaker nozzle part.

12. The wearable device of claim 1, wherein the housing is configured to be worn on a user's ear.

13. A wearable device comprising:

a housing comprising a first surface facing a first direction and having a speaker nozzle part exposed to an outside and a second surface facing a second direction opposite to the first direction and having a microphone hole;

a speaker disposed in the housing;

an electronic component disposed in parallel to a part spaced apart from the speaker and configured to collect an acoustic signal;

a first path connecting the speaker nozzle part and a resonance space of the speaker;

a second path connecting the electronic component and the first path; and a partition wall spatially partitioning the resonance space of the speaker and the electronic component, wherein the housing further comprises a protruding portion forming an entirety of the first path, wherein an end of the protruding portion surrounds the speaker nozzle part, wherein the microphone is disposed outside the protruding portion, wherein the second path diverges from the first path along the partition wall, and wherein the acoustic signal is transmitted from the speaker nozzle part to the microphone along the partition wall through an opening formed at an outer side wall of the protruding portion.

14. The wearable device of claim 13, wherein the partition wall extends from a part of the housing toward the first path, and does not protrude within the first path.

15. The wearable device of claim 13, wherein the electronic component is a microphone.

16. The wearable device of claim 13, wherein the housing comprises a first housing and a second housing that are connected together.

17. The wearable device of claim 13, wherein the electronic component is oriented toward the first direction.

18. The wearable device of claim 13, wherein the electronic component is oriented in a direction perpendicular to the first direction.

19. The wearable device of claim 13, wherein a cross-sectional area of the second path is less than a cross-sectional area of the first path.

* * * * *